US005345542A

United States Patent [19]

Wye

[11] Patent Number: 5,345,542

[45] Date of Patent: Sep. 6, 1994

[54] PROPORTIONAL REPLICATION MAPPING SYSTEM

[75] Inventor: Curtis C. Wye, Long Valley, N.J.

[73] Assignee: AT&T Bell Laboratories, Murray Hill, N.J.

[21] Appl. No.: 136,398

[22] Filed: Oct. 15, 1993

Related U.S. Application Data

[63] Continuation of Ser. No. 722,076, Jun. 27, 1991, abandoned.

[51] Int. Cl.$^5$ .............................................. G06F 15/66

[52] U.S. Cl. .................................... 395/128; 395/129; 395/131

[58] Field of Search ........................ 395/128, 127, 139; 382/47; 358/140, 30; 340/731

[56] References Cited

U.S. PATENT DOCUMENTS

| | | | |
|---|---|---|---|
| 4,439,762 | 3/1984 | Van Vliet et al. | 340/750 |
| 4,454,593 | 6/1984 | Fleming et al. | 395/128 |
| 4,763,279 | 8/1988 | Kellam et al. | 395/109 |
| 4,907,171 | 3/1990 | Nagashima | 395/139 |
| 4,931,954 | 6/1990 | Honda et al. | 395/128 |
| 4,953,025 | 8/1990 | Saitoh et al. | 358/140 |
| 4,974,176 | 11/1990 | Buchner et al. | 395/128 |
| 5,016,193 | 5/1991 | Stone et al. | 395/128 |
| 5,067,019 | 11/1991 | Juday et al. | 358/160 |
| 5,119,082 | 6/1992 | Lumelsky | 340/731 |

*Primary Examiner*—Gary V. Harkcom
*Assistant Examiner*—Michael Smith
*Attorney, Agent, or Firm*—Charles E. Graves

[57] ABSTRACT

A high speed data display routine used in imaging of displays of geographic or other detail depicting, for example, the depth of an ocean, acoustic prediction plots, photographs and logos. The speed is achieved by a process for efficiently mapping the data values to the display matrix. The information processing uses proportional mapping, but only on the two edges of the data matrix. The processing performs substantially fewer calculations during the mapping process, by rely in accordance with certain conventions on straight raw data copying operations using pre-determined counts.

2 Claims, 7 Drawing Sheets

FIG. 14
FINAL MAPPING
Data Matrix
| | | | |
|---|---|---|---|
| A | B | C | D |
| E | F | G | H |
| I | J | K | L |
→
Display Matrix
| | | | | | |
|---|---|---|---|---|---|
| A | B | B | C | D | D |
| E | F | F | G | H | H |
| E | F | F | G | H | H |
| I | J | J | K | L | L |
| I | J | J | K | L | L |
FIG. 16
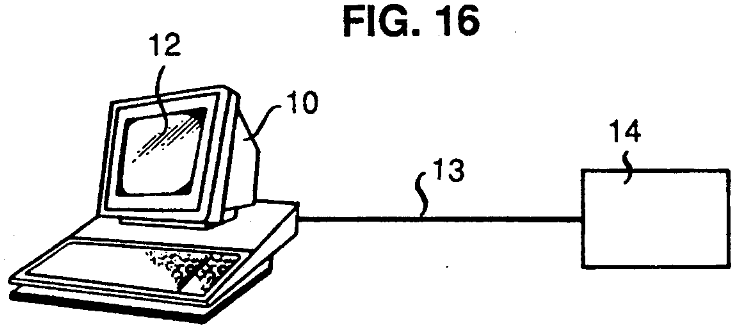
FIG. 17
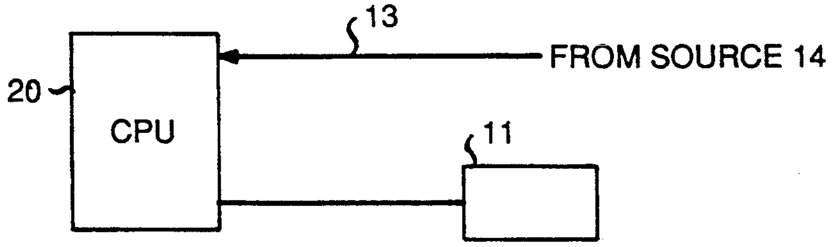

FIG. 15

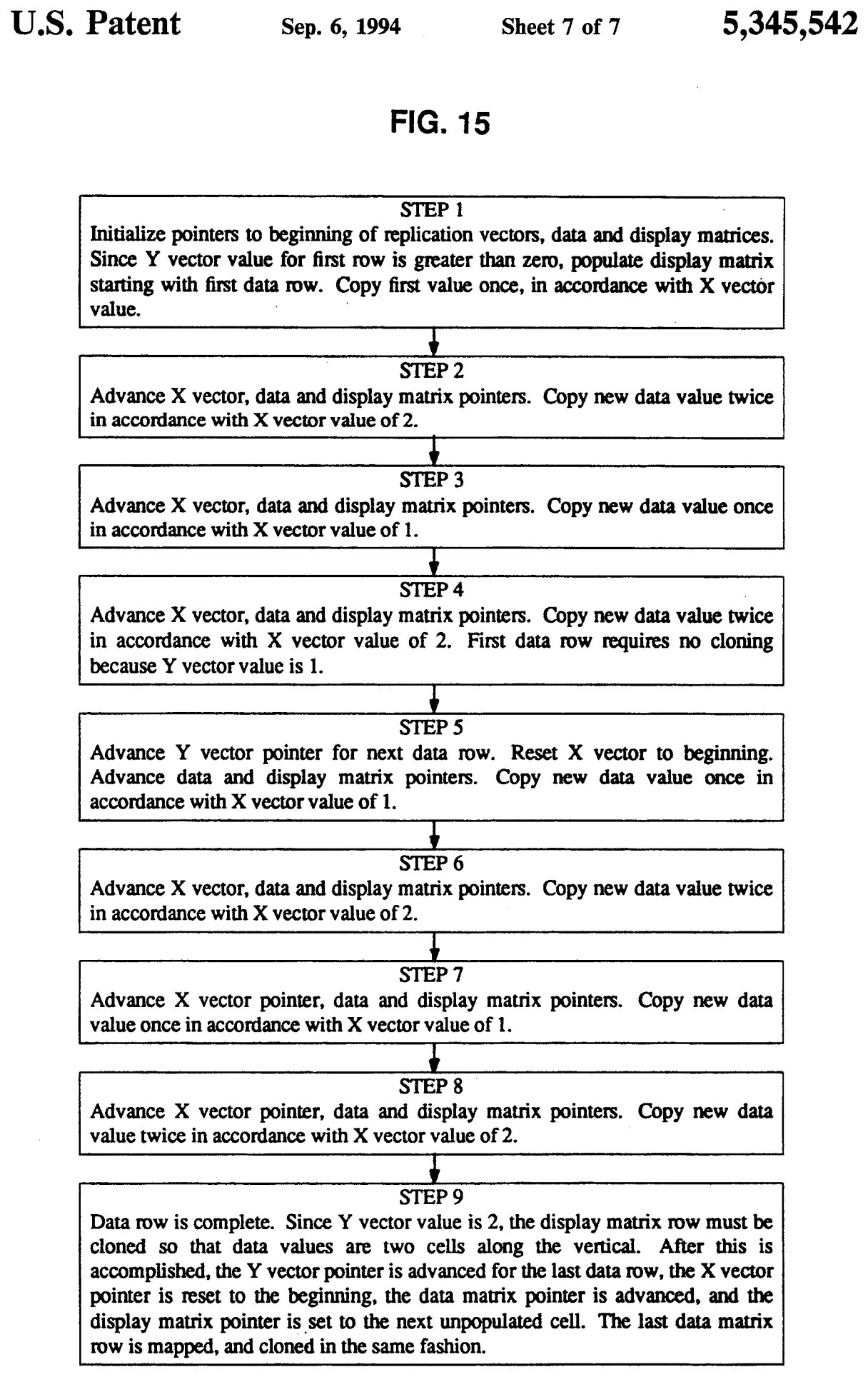

STEP 1
Initialize pointers to beginning of replication vectors, data and display matrices. Since Y vector value for first row is greater than zero, populate display matrix starting with first data row. Copy first value once, in accordance with X vector value.

↓

STEP 2
Advance X vector, data and display matrix pointers. Copy new data value twice in accordance with X vector value of 2.

↓

STEP 3
Advance X vector, data and display matrix pointers. Copy new data value once in accordance with X vector value of 1.

↓

STEP 4
Advance X vector, data and display matrix pointers. Copy new data value twice in accordance with X vector value of 2. First data row requires no cloning because Y vector value is 1.

↓

STEP 5
Advance Y vector pointer for next data row. Reset X vector to beginning. Advance data and display matrix pointers. Copy new data value once in accordance with X vector value of 1.

↓

STEP 6
Advance X vector, data and display matrix pointers. Copy new data value twice in accordance with X vector value of 2.

↓

STEP 7
Advance X vector pointer, data and display matrix pointers. Copy new data value once in accordance with X vector value of 1.

↓

STEP 8
Advance X vector pointer, data and display matrix pointers. Copy new data value twice in accordance with X vector value of 2.

↓

STEP 9
Data row is complete. Since Y vector value is 2, the display matrix row must be cloned so that data values are two cells along the vertical. After this is accomplished, the Y vector pointer is advanced for the last data row, the X vector pointer is reset to the beginning, the data matrix pointer is advanced, and the display matrix pointer is set to the next unpopulated cell. The last data matrix row is mapped, and cloned in the same fashion.

PROPORTIONAL REPLICATION MAPPING SYSTEM

This application is a continuation of U.S. application Ser. No. 07/722,076, filed on Jun. 27, 1993, now abandoned.

FIELD OF THE INVENTION

This invention relates to image processing and, more particularly, to high-speed bit mapping to construct images having a relatively large range of grey scale or color on a viewing screen.

BACKGROUND OF THE INVENTION

There is a growing need to display 2-dimensional images in a range of gray scale or colors. Examples of the use of such 2-dimensional images include displays of geographic detail depicting the depth mapping of the ocean, acoustic prediction plots, photographs and logos.

In these applications, flexibility and versatility in the image generation is useful. For example, it is often desirable to pan on a sub-area of an overall image of the ocean floor, or to zoom on an area of interest, down to the finest degree of detail that is permitted by the granularity of the data.

Further, it is often desirable to reshade an image in order to highlight particular data features. An example of the latter is the reshading of an image of the ocean floor to highlight certain underwater ridges.

One of the problems of the 2-dimensional image processing technology of the prior art is that the process of transforming the data to a displayable image is very time consuming.

Another problem of the prior art image processing technology is that the dimensions or granularity of the source data matrix usually does not correspond to the pixel pattern of the viewing screen. For example, if the picture element count on the viewing screen is 1000×1000, and the data matrix has a different data element count either of greater density or lesser density than that of the viewing screen, then there is a problem of deciding which data elements get mapped to which display screen pixels.

A related problem is that the X-Y proportions of the raw input data in the preceding situation (aspect ratio) may not correspond to the X-Y proportions of the screen area for many reasons, including the fact that screens are not available in a standard aspect ratio.

In the prior art, displaying a data matrix as solid-shaded colors on a rectangular screen area involves three steps. In the first step, data values are mapped to a display matrix. In the second step, the raw data values are convened to color values. These values usually are an index into a color map. In the third step, the display matrix, which is in memory, is bit block transferred to display memory.

Efficient mechanisms for the transferring a display matrix from general-purpose memory to display memory are generally available today. Converting each data point to a color index, however, requires some care, in order not to degrade performance. Efficient mapping techniques therefore are critical.

There are several approaches in the prior art for mapping data matrixes to computer screens. One involves mapping each picture element in the screen viewport to the data matrix using the ratios of their sides. This process, termed "proportional mapping," may require two floating point multiplies, two float to integer conversions, and an integer multiply and add for each of possibly a million pixels; and is likely to be slow to execute.

Another approach is to precompute the data offsets for each pixel location in X and Y, and combining the offsets at each display element to yield the corresponding data item. While this approach reduces the math required per display element, the fact that each display element continues to require any computation results in a slow routine.

A third approach is to create an oversized bitmap, and then bit block transfer a subportion having similar proportions as the screen area. This approach is initially slow, inflexible as far as displaying only the data of interest in a prescribed screen area, and is memory restricted.

Yet another approach of the prior art is to arbitrarily decimate or replicate the raw data, so that it will have similar proportions as the screen area. This has the disadvantages of being restrictive, and it introduces unnecessary distortions.

OBJECTS OF THE INVENTION

Accordingly, one object of the invention is to provide high-speed bit map display routines for use in bathymetry and acoustic prediction plots.

Another object of the invention is to efficiently display 2-dimensional images in a wide range of gray scale or colors.

A more general object of the invention is to transform raw plot data to a displayable image with a minimum of distortion arising from the data transformation and with minimum computation.

SUMMARY OF THE INVENTION

In accordance with the invention, a high-speed data display routine is achieved by a process for efficiently mapping the data values to the display matrix. The information processing uses proportional mapping, but only on the two edges of the data matrix. In addition, the processing performs relatively few calculations during the mapping process, relying instead on straight copy operations using predetermined counts. These counts are derived from the mapped edges and are stored into two "replication vectors."

As will be seen below, the advantages to this invention are that far fewer sets of calculations are required than conventional approaches. An additional benefit occurs because, in practice, the data matrix is often smaller than the display grid, resulting in fewer points to be mapped than with traditional mapping of display pixels to data.

Because true proportional mapping is employed by the invention, distortions caused by uneven mapping are uniformly spread throughout the display area in a way that minimizes their presence. In those cases where the ratios of the matrix edges is an integer, the present invention yields the same result as straight pixel replication. The invention improves the art of displaying images in a range of grey scale and colors by reducing the amount of calculations needed to do color translations from the data matrix to the display. Specifically, the raw data in the data matrix is efficiently re-mapped to the display matrix, and the re-mapped data has its color values recomputed.

DETAILED DESCRIPTION

FIGS. 5 through 13 inclusive are further illustrative diagrams showing in detail the mapping of data points from a data matrix onto a display matrix pursuant to the invention;

FIG. 14 is a diagram showing the final mapping;

FIG. 15 is a flow chart of the steps in practicing the invention;

FIGS. 16 and 17 are schematic block diagrams of illustrative apparatus and systems for practicing the invention; and

DETAILED DESCRIPTION OF ILLUSTRATIVE EMBODIMENT

Figure 1:
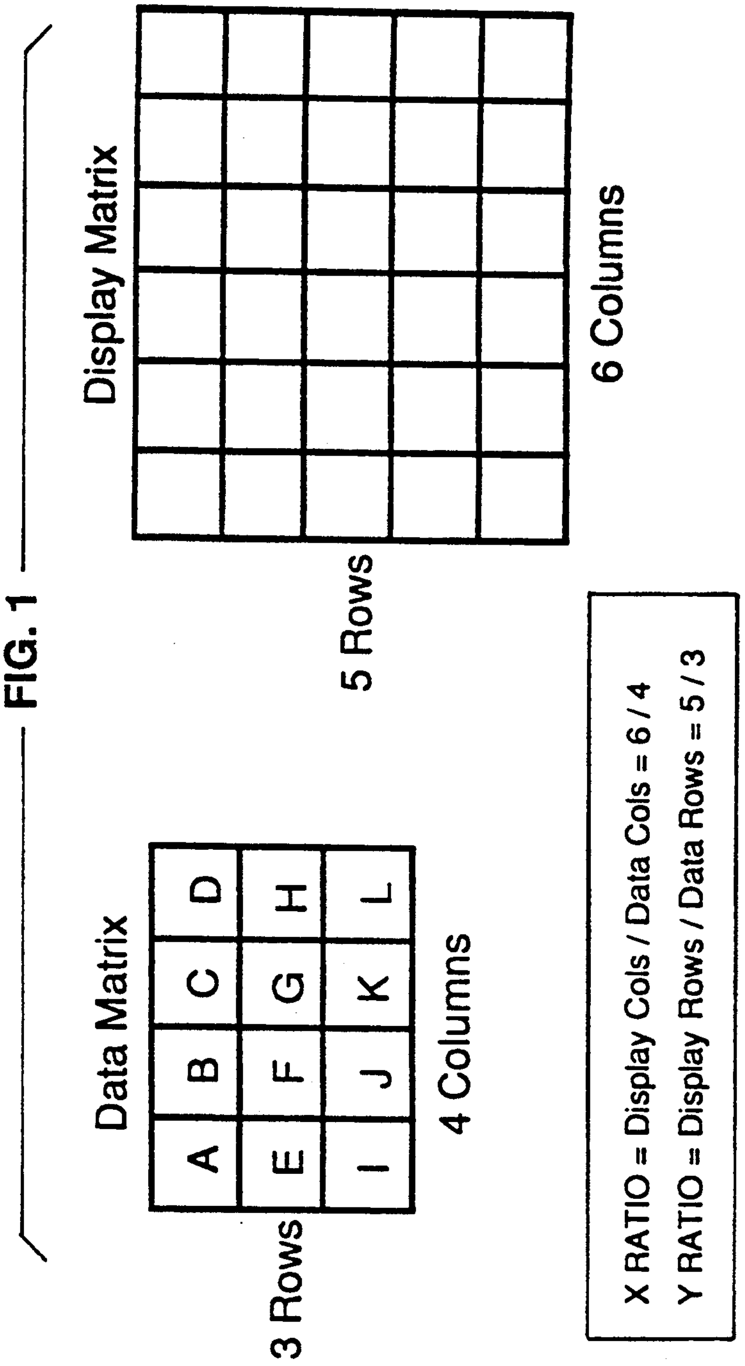
FIG. 1 is a diagram depicting two matrices of data to be reconciled.

Referring now to FIG. 1, there is illustrated the application of the invention for a simple data matrix and a simple display matrix which have different proportions. Specifically, the data matrix comprises four columns and three rows, the matrix positions or points being denoted by letters A–L. The display matrix comprises six columns and five rows, wherein the columns and rows are unlabeled. The objective is to map the data matrix points A–L in an acceptable fashion onto the display matrix with minimal computation.

FIG. 14 illustrates the resultant mapping, achieved in accordance with the teachings of the invention. The data point information processing by which the final mapping is achieved is next described.

Going back to the example of FIG. 1, the ratio of each display matrix dimension to its corresponding data matrix dimension is first determined. Thus, the X ratio represents their relative horizontal dimensions (columns); and the Y ratio reflects their relative vertical dimensions (rows). These are referred to as dimension ratios. The X-ratio is: display columns/data columns, or 6:4. The Y-ratio is: display rows to data rows, or 5:3 in the example.

Figure 2:
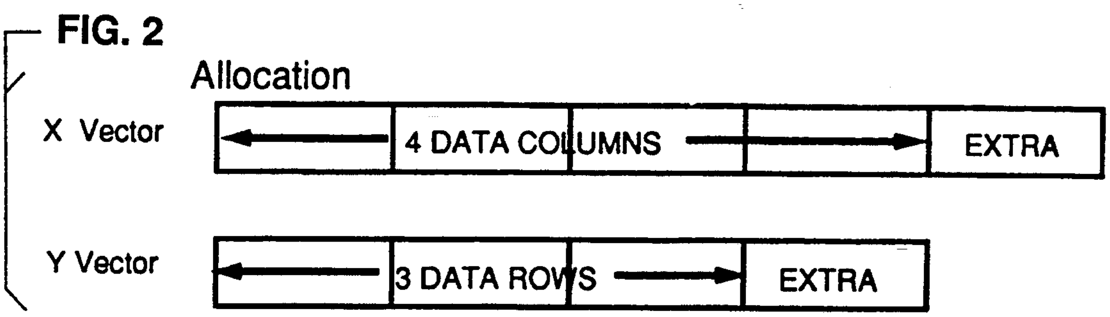
FIG. 2 is a diagram showing allocations of X- and Y-vector values in accordance with the invention.

Now, in accordance with the invention, two replication vectors are created and allocated—one for each axis (X,Y) of the data matrix shown in FIG. 1. The X and Y vector representations are shown in FIG. 2, and may be viewed as consisting of "elements," which are adjacent map points to be populated. The X vector determines the number of horizontal pixels assigned to each data column, and the Y vector is used to describe the number of vertical pixels per data row. In accordance with one aspect of the invention, each vector is one element longer than the data matrix dimension it represents, as can be noted in FIG. 2.

Figure 3:
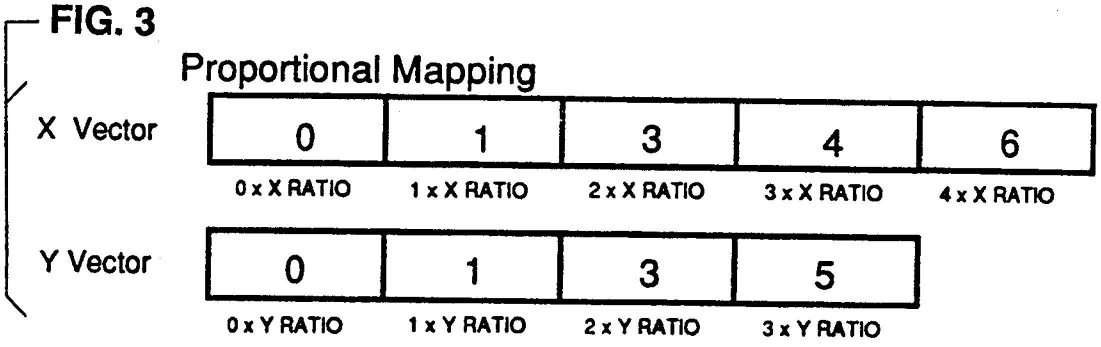
FIG. 3 is a diagram illustrating the proportional mapping protocols of the invention.

As illustrated in FIG. 3, each element in both vectors now is "populated." This process is achieved by successively multiplying each element's relative position (in the example, X-vector positions are: 0, 1, 2, 3, and 4) within the vector, by the dimension ratio for that vector, and rounding off by the technique of integer or floating point truncation. For example, for the (2) position, the number (2) is multiplied by the X-vector dimension ratio of 6/4: thus, 2*6/4=3. These values represent the proportional mapping of the data edges (X,Y) to the display matrix edges (X,Y), resulting in values of: 0, 1, 3, 4, 6 as seen in FIG. 3. Likewise, for the (2) position of the Y-vector, the number (2) is multiplied by the Y-vector dimension ration of 5/3: thus, 2*5/3=3 (rounded off). In this process, even the last "extra" element is populated.

Figure 4:
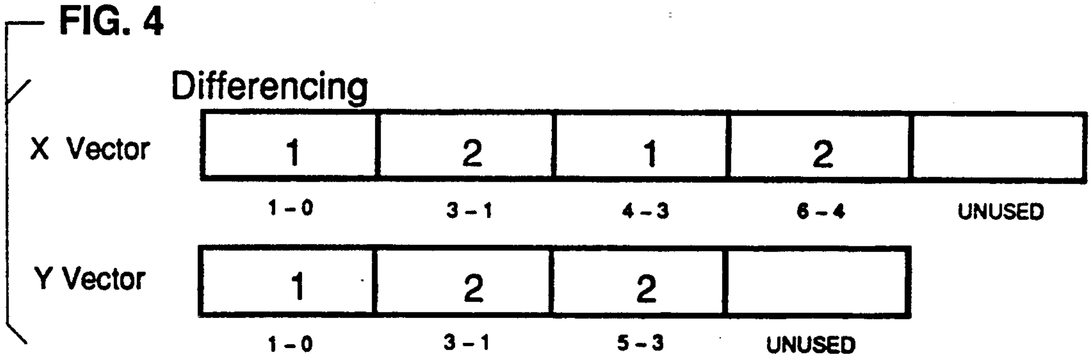
FIG. 4 is a diagram illustrating the differencing step of the invention.

Now, as illustrated in FIG. 4, each element in both vector directions (X,Y) is recalculated by subtracting its value from the value of the element in the following position. Thus, for the (3) position in the X-vector, the recalculation yields: 6−4=2. This difference, in accordance with the invention, represents the number of times a data value will be copied to the data matrix (see again FIG. 1) along a particular axis.

In accordance with the invention, the data matrix drives the processing. Data is sequentially copied from the data matrix to the display matrix starting at their first elements. Replication counts derived from the replication vectors govern the copying. The row and column positions of each data element within the data matrix determine the applicable replication counts. The column position is used within the X vector to get the X replication count, and the row position is used to index the Y vector to obtain a Y replication count. Each data point is converted to a color value, and that value is copied to the display matrix the number of times indicated by its X replication count.

To illustrate the step-by step processing in accordance with the invention, the flow chart of FIG. 15 describes the several sequential steps of data manipulation that are successively illustrated in FIGS. 5–13, and which result in the final data matrix mapping shown in FIG. 14.

Figure 5:
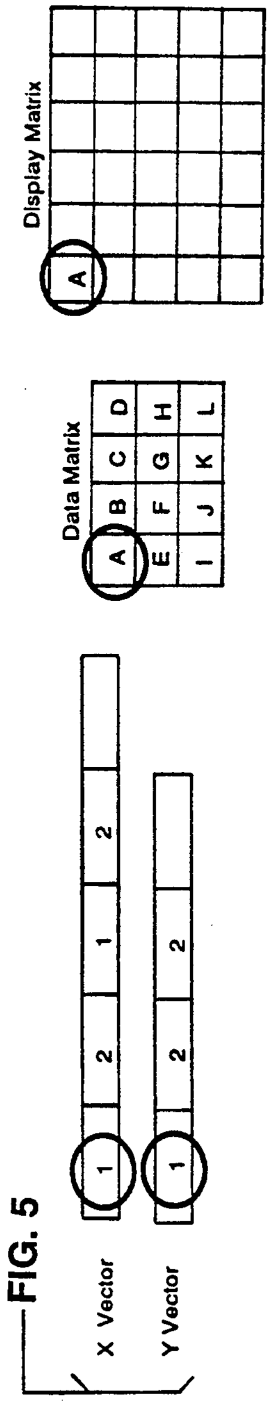

In step 1 shown in FIG. 5, pointers (denoted for illustration by ellipses, but persons skilled in the art will recognize that the term is a standard computer processing step designation) are initialized to the beginning of the replication vectors, data, and display matrices (recall that the X-positions are denoted 0, 1, 2, 3, 4; and the Y-positions are denoted 0, 1, 2, 3). The Y-vector value for the first row being greater than zero, the step calls for populating the display matrix, starting with the first (top) data row. The data point "A" in the left-most element of the top row now is replicated once, in the left-most element of the top row of the display matrix.

Figure 6:
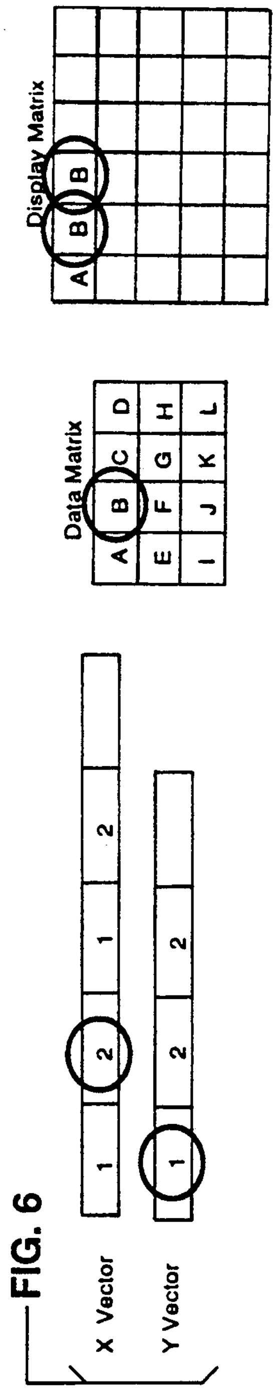

Proceeding, as seen in FIG. 6, the X-vector is advanced to position (1); and the data and display matrix pointers are also advanced. The data value is "B". The X-vector value being (2), the data value "B" is copied twice in the two successive positions in the top row following the data value "A." Now, the top row of the data matrix is populated: "A B B."

Figure 7:
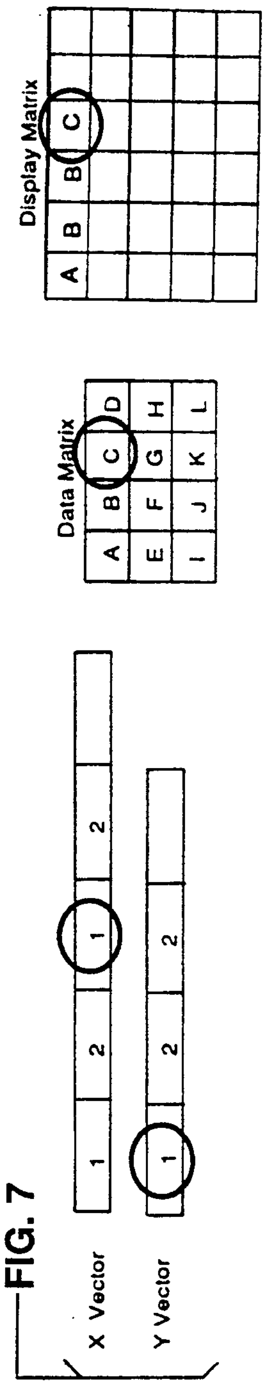

Proceeding, as seen in FIG. 7, the X-vector, data and display matrix pointers are again advanced. The data value now is "C." The X-vector value being (1), the data value "C" is copied once in the position in the top row following the last data value "B." Now, the top row of the data matrix is populated: "A B B C."

Figure 8:
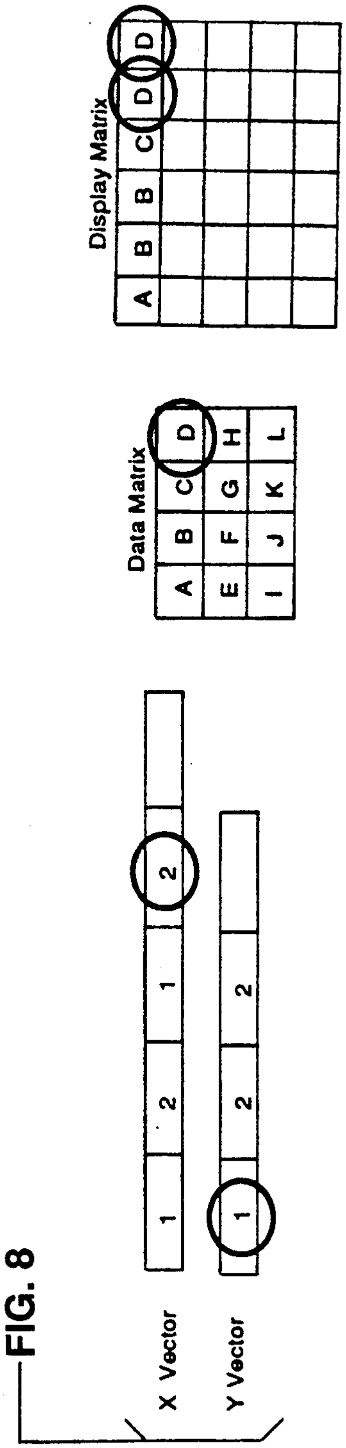

Proceeding, as seen in FIG. 8, the X-vector, data and display matrix pointers are again advanced. The data value now is "D". The X-vector value being (2), the data value "D" is copied twice in the positions in the top row following the data value "C." Now, the top row of the data matrix is populated: "A B B C D D." This completed the population of the top row of the data matrix, and executes the Steps 1–4 of FIG. 15.

Figure 9:
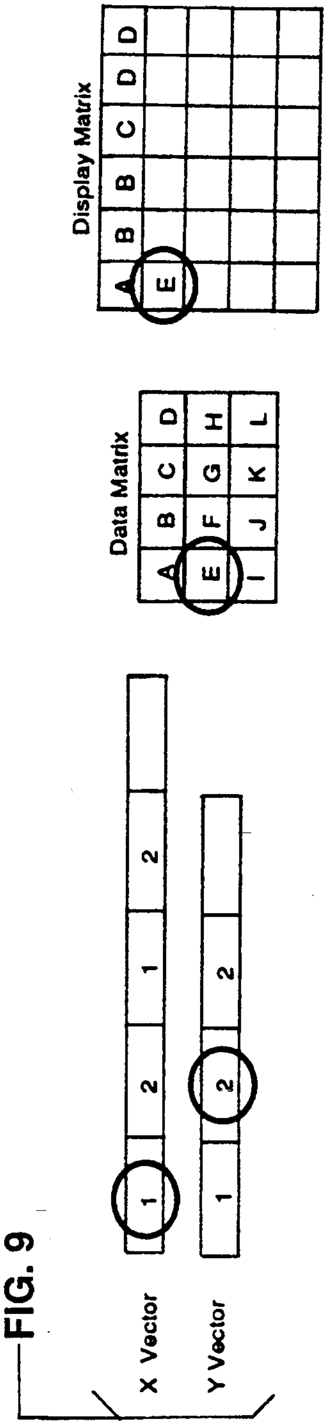

Now, in accordance with the invention in Step 5, the Y-vector pointer is advanced for the next data row; its value is (2). The X-vector is reset to the beginning; and the data and display matrix pointers are advanced. As seen in FIG. 9, the data value now is "E." The X-vector value being (1), the data value "E" is copied once in the position in the second row.

Figure 10:
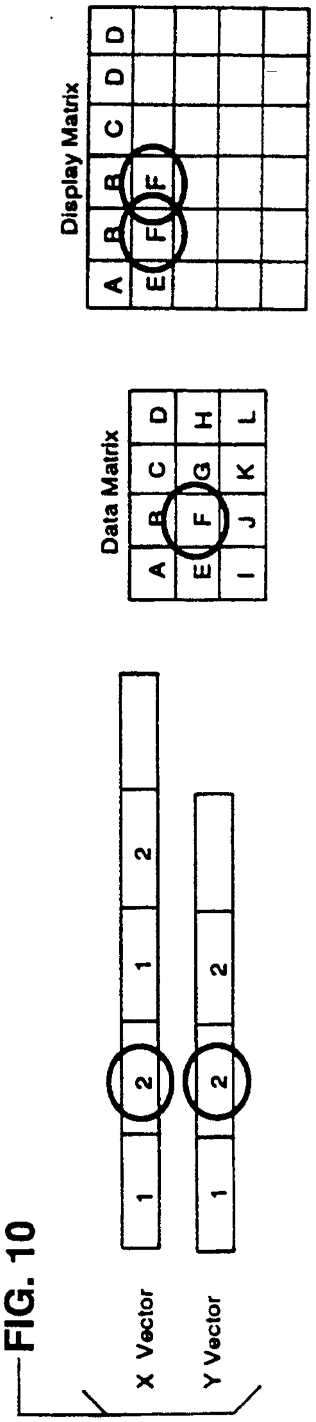

Proceeding, as seen in FIG. 10, the X-vector, data and display matrix pointers are again advanced. The data value now is "F". The X-vector value being (2), the data value "F" is copied twice in the position in the second row following the last data value "E." Now, the second row of the data matrix is populated: "E F F."

Figure 11:
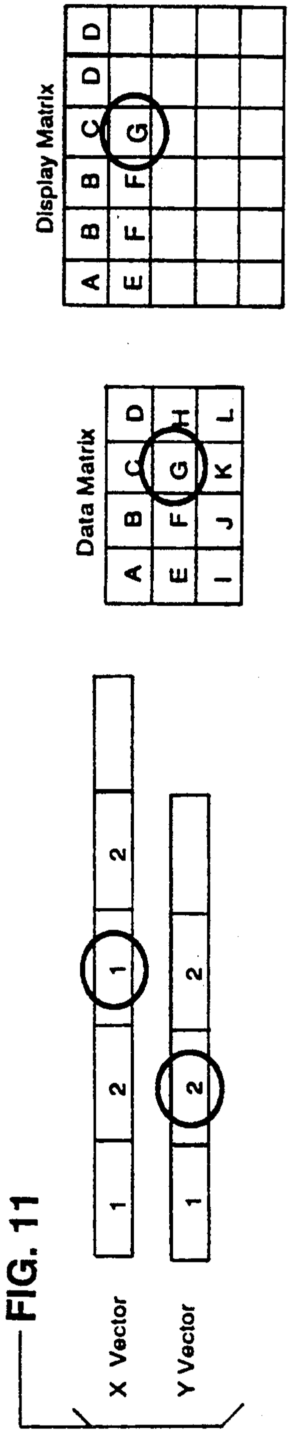

Proceeding, as seen in FIG. 11, the X-vector, data and display matrix pointers are again advanced. The data value now is "G." The X-vector value being (1), the data value "G" is copied once in the position in the second row following the last data value "F." Now, the second row of the data matrix is populated: "E F F G."

Figure 12:
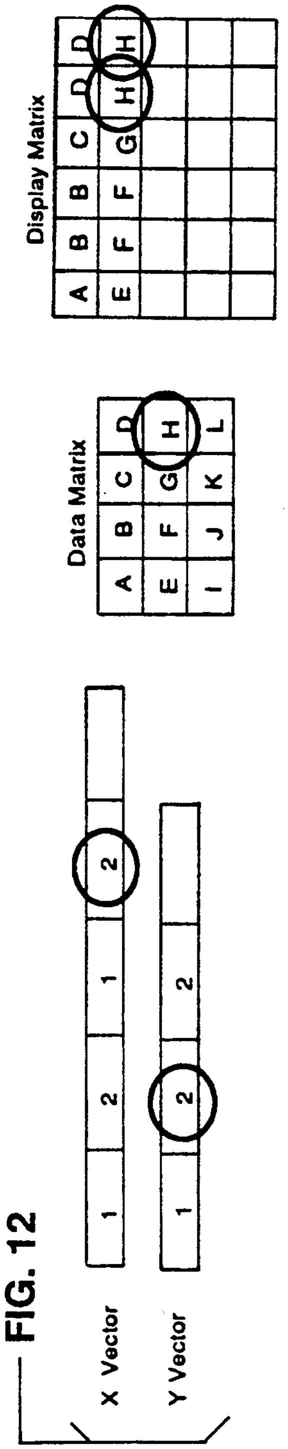

Proceeding, as seen in FIG. 12, the X-vector, data and display matrix pointers are again advanced. The data value now is "H." The X-vector value being (2), the data value "H" is copied twice in the position in the second row following the last data value "G." Now, the second row of the data matrix is populated: "E F F G H H," which completes the second row of the data matrix, and executes the Steps 6–8.

Figure 13:
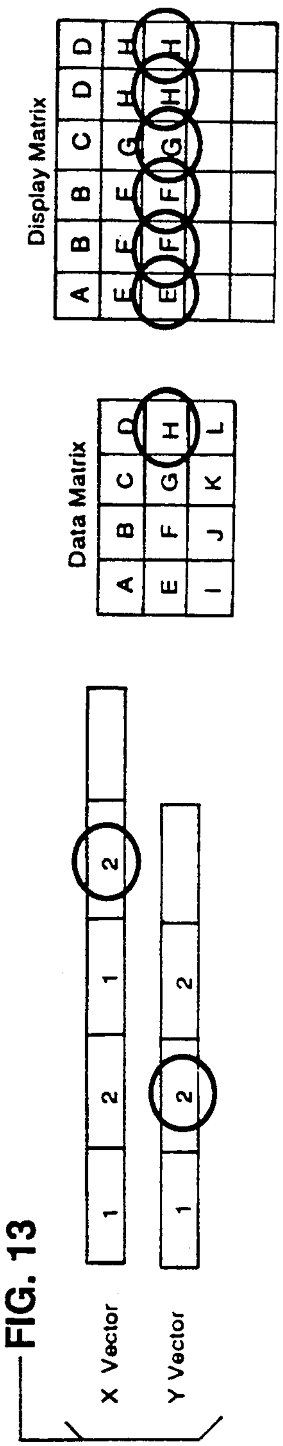

Now, since the Y-vector value is (2) as seen in FIGS. 9 through 13, the display matrix second row just-completed is replicated to populate the third display matrix row. The result is shown in FIG. 13.

Next, the Y-vector pointer is advanced for the last data row for which, as seen in FIG. 13, its value is (2). The X-vector pointer is reset to its beginning point, which already has been described in connection with FIGS. 5 and 9. By following the same rules as have been described, the fourth display matrix row, seen in FIG. 14, is now populated: "I J J K L L."

Since the Y-vector value is (2), the fourth row is replicated into the fifth row. The final mapping is shown in FIG. 14.

In general, if the data density is greater than the display resolution, there may be a replication count of zero for some data points, which ordinarily means they would be discarded. Peak-picking or averaging schemes have been employed at this point to preserve the integrity of the data. For example, in a peak-picking scheme, data points that ordinarily would be discarded are instead compared to the nearest data point being mapped. In this comparison, the data point having the greatest value is selected to be transferred to the display matrix. This expedient assures that the highest values will be displayed.

Mapping a data row in the above manner is contingent on the Y replication count being non zero. Otherwise, a zero count indicates that the data row does not map to the display matrix, meaning that there are not enough pixels in the display screen.

The whole-row cloning described with respect to the third and fifth display matrix rows, is done by using whole word moves, which involves minimal computation and can be done at the same speeds as rectangular fill routines.

One measure of calculation time saved in an experimental application of the invention indicated that only 2,000 sets of mapping calculations were needed for a 1000×1000 matrix, versus 1,000,000 sets of mapping calculations for a conventional approach.

The process practiced by the invention can be extended to benefit data having more than two dimensions. For example, an animated sequence of display frames could use the invention to map frames to time slots (where the frame sampling may be out of synchronization) as well as for mapping data to individual frames.

The invention may be practiced using, for example, a SUN workstation model SPARCstationZ as seen in FIG. 16 and denoted 10. As a training aid, workstation 10 may be stand-alone; in which case a data store 11 connected to the workstation central processor unit 20 and preloaded with mapping data as depicted in FIG. 17 provides the raw data to be mapped to the screen 12 of the workstation 10.

Alternatively, the system may be connected by a communications link 13 to a remote data-gathering source 14 which obtains selected data, formats it and transmits the raw data to the workstation 10. The type of data gathered by source 14 may, for example, be data on ocean or atmospheric thermal or pressure conditions; seismic activity in selected planes in specific bounded locales; or the like. Further, the source data can be purely numeric measures of some specific interest such as distributed inventory data, account balances, or anything that in an increasingly graphics-oriented workplace lends itself to screen display.

I claim:

1. A method for forming a visual image on a display device, comprising an array of picture elements, the method comprising the steps of:

a) performing physical measurements at an array of points in a two-dimensional space, each of said measurements leading to a corresponding acquired value;

b) storing the acquired values as an input matrix embodied in a digital data storage device, wherein the input matrix consists of plural rows and columns of matrix elements along X- and Y-axes and has X and Y edges;

c) mapping image information from the input matrix to a display matrix embodied in a digital data storage device, wherein the display matrix consists of plural rows and columns of matrix elements along X and Y axes and has X and Y edges; and d) activating each picture element to the display device according to a corresponding matrix element of the display matrix, wherein the mapping step comprises the step of:

(e) computing an X-dimension ratio of the number of display matrix columns to the number of input matrix columns;

(f) computing a Y-dimension ratio of the number of display matrix rows to the number of input matrix rows;

(g) computing an X-replication vector consisting of the number of elements in each input matrix column;

(h) computing a Y-replication vector consisting of the number of elements in each input matrix row;

(i) populating each element in each said X- and Y-replication vector by:

(j) multiplying each said element's relative position within said vector by said dimension ratio for that vector, thereby to create a proportional mapping of said X- and Y-data matrix edges to said X- and Y-display matrix edges; and (k) recalculating each said element in both said replication vectors by:

(l) subtracting its value from the value of the element in the following position along said vector, to create a replication count for each said element; and (m) copying each element of the input matrix into a number of columns of the display matrix equal to the replication count at the corresponding position in the X-replication vector; and (n) copying each element of the input matrix into a number of rows of the display matrix equal to the replication count at the corresponding position in the Y-replication vector.

2. The process of claim 1, wherein in the multiplying step, the result is rounded off to the nearest integer.

* * * * *